Aug. 10, 1926.　　　　　　　　　　　　　　　　　　1,595,244
　　　　　　　　　　J. PRICE
　　DENSITY REGULATOR FOR CONCENTRATING EVAPORATORS
　　　　　　　Filed Nov. 28, 1921　　　2 Sheets-Sheet 1
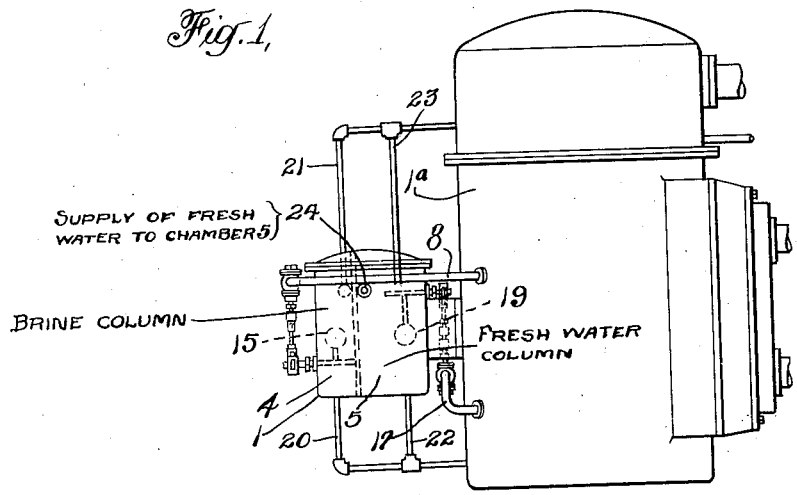
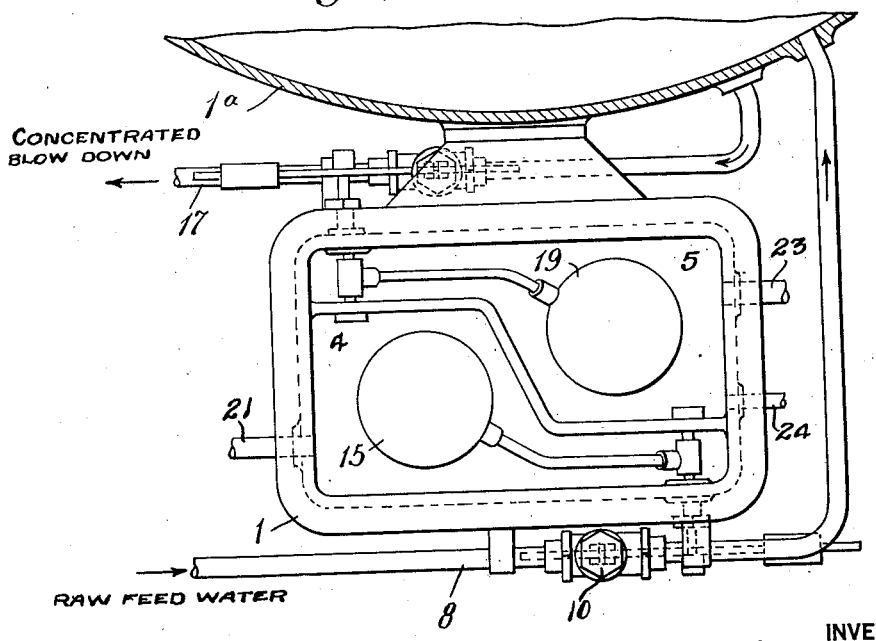
INVENTOR
Joseph Price
BY
ATTORNEYS

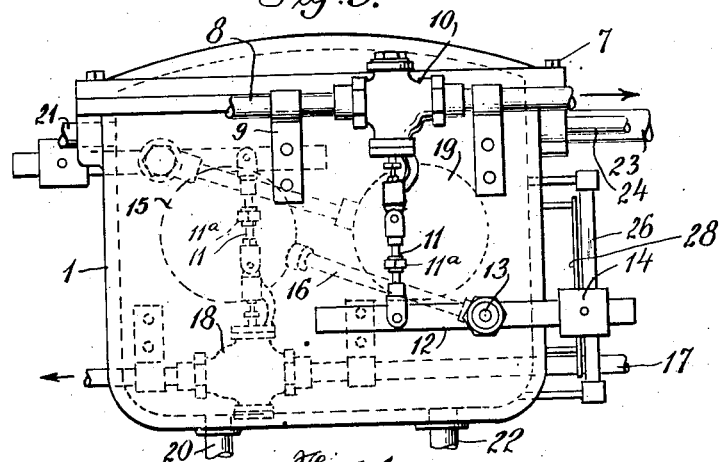
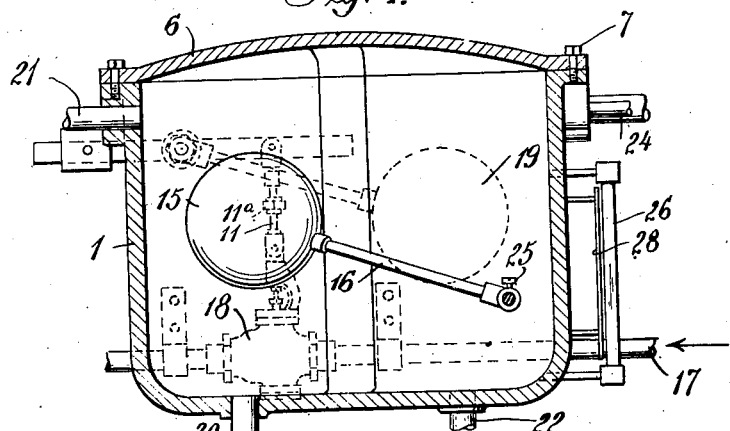
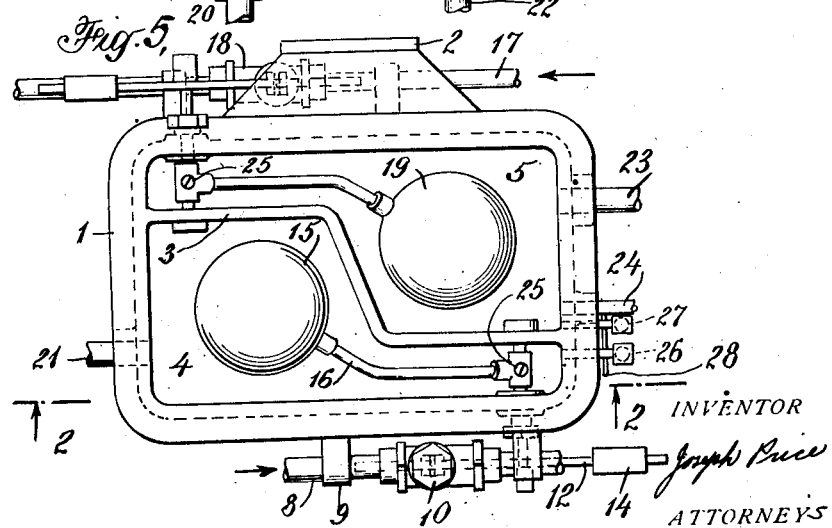

Patented Aug. 10, 1926.

1,595,244

UNITED STATES PATENT OFFICE

JOSEPH PRICE, OF NEW YORK, N. Y., ASSIGNOR TO THE GRISCOM-RUSSELL COMPANY, OF NEW YORK, N. Y., A CORPORATION OF DELAWARE.

DENSITY REGULATOR FOR CONCENTRATING EVAPORATORS.

Application filed November 28, 1921. Serial No. 518,152.

The present invention relates to regulating apparatus for an evaporator, and has to do particularly with apparatus for automatically maintaining the brine density constant in a sea water evaporator.

In evaporator construction it is common to provide a water gauge to indicate the height of liquid in the evaporator shell and to provide additional means for indicating the salinity of the solution. When the water level drops, as indicated by the gauge glass, additional raw water may be admitted by manually opening the admission valve of the evaporator. When the salinity of the solution increases beyond a desired value a quantity of the concentrated brine may be discharged through the blow-down connection of the evaporator and sufficient raw water admitted to again bring the liquid within the shell to the desired level, and at the same time reduce the brine density.

It has also been proposed to automatically regulate the evaporator feed and the discharge of concentrated liquid from the evaporator, and to maintain the desired concentration of the evaporator liquid by cooperatively regulating the feed and blow-down so that the quantity of discharged liquid always bears a fixed proportion to the quantity of feed. This may be accomplished by means of a double-acting pump or by balanced valves actuated by the flow of liquid through the feed and discharge lines. Such a system is open to the objection, however, that the density of the liquid is regulated only indirectly by proportioning the respective quantities of liquid admitted and discharged.

It is a principal object of the invention to provide a regulating apparatus of the above type, which is actuated directly in relation to the salinity of the liquid contained in the evaporator shell and which will maintain a substantially constant brine density regardless of variations in quality of the feed.

It is a further object of the invention to provide an apparatus of the above type which will also maintain the liquid level within the evaporator at a substantially fixed value.

It is a further object to provide an apparatus of the above type in which the liquid level maintained in the evaporator may be conveniently regulated over a substantial range and the concentration of the blow-down discharge varied throughout a substantial range of densities, and in which a scale is provided for conveniently indicating the density of the liquid within the evaporator at all times.

It is a still further object to provide a regulating apparatus of this type of compact rugged construction which may readily be secured directly to the evaporator shell to constitute essentially a part of the evaporator unit, and whose cost is within practical commercial limits.

I have illustrated a preferred embodiment of my invention in the accompanying drawings, in which Figure 1 is a somewhat diagrammatic elevational view showing my improved regulating apparatus attached to an evaporator; Figure 2 is a horizontal sectional view taken through the apparatus of Figure 1; Figure 3 is an elevational view illustrating in some detail a regulating apparatus embodying my invention; Fig. 4 is a vertical sectional view taken on line 2—2 of Fig. 5; and Fig. 5 is a top view of the apparatus with the cover removed.

Referring to the drawings, 1 indicates the shell or housing which contains the parts of the regulating apparatus and is provided with an integral bracket 2 machined at its outer surface to afford convenient means for attachment to the shell 1ᵃ of the evaporator. A vertical partition or web 3 is cast integrally with the shell 1 and serves to divide the space within the shell into two vertical fluid chambers 4 and 5. A cover 6 is preferably provided to shut off the interior of the housing and may be held in place by bolts 7 spaced about its periphery and extending through a flange provided at the upper end of the housing 1.

The evaporator shell is supplied with raw feed water through the line 8, here shown as a straight pipe supported along the upper side of the housing 1 by means of brackets 9 secured to the body of the housing. The pipe line 8 enters the shell at any desired point to thus admit water to the evaporating space within the shell, preferably near the normal level of the liquid. In the pipe 8, preferably between the brackets 9, I insert a valve 10 for the purpose of controlling the flow of feed water to the evaporator. Valve 10 may be of any desired construction, but I preferably employ a balanced valve having an actuating link 11 secured to one arm of a lever 12 pivoted to the body of the housing at 13 and carrying at its opposite end a counterweight 14. Rotation of the lever 12 about its pivot point will produce an up or down movement of the valve plunger 11 and will close or open the valve, as the case may be. Motion is imparted to the valve actuating mechanism by means of a ball float 15 positioned within the fluid chamber 4 and provided with a handle or lever 16 which is integrally secured to the same pivot or shaft 13 upon which the lever arm is mounted.

Likewise the discharge line for conveying away concentrated blow-down from the evaporator is shown as a pipe line 17 extending horizontally along the lower edge of the housing 1 and provided at a portion of its length with a balanced valve 18 actuated by a ball float 19 positioned within the fluid column 5. The pipe 17 withdraws the concentrated liquid from a point at or near the bottom of the shell. Regulation of the flow of concentrated liquid through the pipe line 17 is in all respects similar to that described for regulation of the evaporator feed.

A pipe 20 communicates with the lowermost portion of the fluid chamber 4 and extends to the evaporator shell, connection being made at the lowest possible point on the evaporator. Through pipe 20 the chamber 4 fills with brine of a density equal to that in the evaporator shell and whose level corresponds to the liquid level within the evaporator. Under normal conditions when the liquid level is at the desired height the ball float 15 is raised to a position such that it closes the feed control valve 10. If, however, the liquid level within the evaporator recedes, the consequent lowering of the ball float 15 will effect an opening of the valve 10, whereupon additional feed water will be admitted to the evaporator shell until float 15 rises sufficiently to shut off the flow by closing valve 10. An equalizer pipe 21 is preferably provided to connect the upper end of the chamber 4 with the vapor space of the evaporator.

A pipe 22 communicates with the uppermost point of the chamber 5 and has its opposite end connected to the evaporator shell at a depth equal to that at which pipe 20 is connected. A pressure equalizing pipe 23 is also provided at the upper end of the chamber to connect it with the vapor space of the evaporator shell. Additionally to the equalizer pipe a preferably smaller pipe 24 opens into the upper end of chamber 5 and is employed to gradually convey a relatively small quantity of fresh water into the chamber 5. This pipe 24 may conveniently be attached directly to the drain line leading from the heating coils of the evaporator so that the supply of fresh water admitted to the chamber 5 consists of condensate from the evaporator heating element. The rate at which this fresh water is admitted is not sufficient to appreciably raise the liquid level within the chamber, but serves to keep the chamber supplied with water of substantially no salinity. This water passes into the evaporator through pipe 22. Since the pipes 20 and 22 are attached to the evaporator at the same depth, the pressure available for supporting the liquid columns in chambers 4 and 5 are identical. Since chamber 5 is filled with fresh water, the height of the water column supported therein will be greater than that in chamber 4, the difference in the height of the columns being directly proportional to the salinity of the evaporator liquid.

Change in level of the water within the fresh water chamber 5 serves to operate the control valve 18 in the discharge line from the evaporator. An increase in the salinity of the evaporator liquid results in an increased difference in the height of the two liquid columns 4 and 5. As a result the float 19 will be lifted, thus opening valve 18 and causing a portion of the concentrated liquid to be discharged. Such discharge will reduce the liquid level within the evaporator, whereupon float 15 will open the admission valve 10 and cause fresh feed water to be admitted until the liquid in the shell again reaches normal level. The inrush of additional raw water reduces the salinity of the solution and serves to maintain the brine density at the desired value.

The arms 16 provided on the ball floats 15 and 19 are secured at their lowermost extremities to the valve operating shafts by means of set screws 25. Each of the floats may thus be adjusted relative to the valve operating shaft by loosening the set screw 25 and rotating the float supporting arm 16 about the shaft through any desired angle and securing it in its adjusted position by tightening the set screw. For instance, if it is desired to regulate the liquid level maintained in the evaporator shell, the float 15 in the brine chamber 4 may be adjusted about its valve operating shaft to any desired extent. If it is desired to increase the liquid level the float 15 (as shown in Fig. 2) will be rotated about the shaft in a clockwise direction, thereby giving the float a higher elevation at a given position of the feed control valve 10. Likewise, the liquid level in the fresh water chamber 5 at which the discharge valve 18 is caused to open may be varied by shifting the position of the ball float 19 relative to the valve operating shaft. That is, rotation of the float 19 (as shown in Fig. 2) in a counter-clockwise direction about its valve actuating shaft will permit a higher liquid level to be reached within the fresh water chamber 5 before valve 18 is caused to open. With a given setting of the feed control float 15 such increase in level in the fresh water chamber means that a greater differential head between the two water columns must be obtained before a blow-down discharge occurs. Extensive adjustments are accomplished in this manner, but for finer adjustments the link 11 is preferably threaded oppositely at its respective ends and provided at a portion of its length with an integrally formed nut portion 11ª. Upon applying a wrench to the nut 11ª and turning the link 11 it is evident that the threaded portions at the ends of the link will serve to draw together or force apart the cooperating members attached to the ends of the link depending upon the direction in which the nut 11ª is turned. This arrangement affords convenient means for effecting minute adjustments of the valves 10 and 18 and is further advantageous because of the fact that this adjustment can be made while the apparatus is in operation, and without removing the cover 6 or other parts of the device. The above adjustments afford a convenient and accurate means for regulating and maintaining the brine density within the evaporator at any desired value throughout a wide range of adjustment.

At one side of the shell 1, in a convenient location, I preferably provide gauge glasses 26 and 27 to indicate respectively the mean liquid level within the brine and fresh water chambers. Inasmuch as the differential head between the liquid columns occurring in these gauge glasses is directly proportional to the density of the brine within the evaporators, I may conveniently provide a scale or equivalent indicating device 28 mounted directly behind the gauge glasses 26 and 27 and designed to indicate the difference in level between the two liquid columns. Such reading may easily be used to indicate the brine density within the evaporator by applying a simple proportionality factor, or the scale itself may conveniently be calibrated directly in terms of liquid density.

It is to be noted that the structure of my improved regulating apparatus is especially substantial and compact. It may conveniently be applied by means of bracket 2 as an essentially integral part of the evaporator unit. Furthermore it may be easily applied to evaporators already installed without undue expense or labor.

While I have illustrated a preferred embodiment of my invention, it is to be understood that the construction of various parts, the arrangement of the elements within the containing shell, and the like, may be varied within the full scope of the appended claims.

I claim:—

1. Regulating apparatus for an evaporator comprising a chamber for containing a column of liquid of density identical with that of the liquid in the evaporator shell and supported by the pressure of the liquid in the shell, means for regulating the admission of raw feed water to the evaporator, a second chamber for containing a column of fresh water supported by the same pressure which supports said first mentioned liquid column and means for discharging concentrated liquid from the shell according to the height of the fresh water column.

2. Regulating apparatus for an evaporator comprising a chamber for containing a fresh water column supported by the pressure of the brine in the evaporator shell, means for maintaining a substantially fixed brine level in the evaporator and means controlled by the difference in the level of the evaporator brine and the said fresh water column for regulating the discharge of concentrated liquid from the evaporator to thereby maintain a substantially constant liquid density in the evaporator shell.

3. Regulating apparatus for an evaporator comprising means for containing two fluid columns communicating with the evaporator shell at the same level and thereby supported by identical pressures, the liquid in one column having a density at all times substantially identical with that of the liquid in the evaporator shell and the fluid in the other column having a constant density whereby the height of said column will vary with varying density of the liquid in the evaporator and means for controlling the admission of liquid to the evaporator shell and the discharge of liquid therefrom to thereby maintain the density of the liquid in the evaporator shell substantially constant, said controlling means depending for its actuation upon variation in the difference of height of said two liquid columns.

4. Regulating apparatus for an evaporator, comprising a chamber for containing a brine column supported by the pressure of the liquid within the evaporator, a second chamber for containing a fresh water column supported by the same pressure and means for regulating the rate of discharge of concentrated liquid proportionally to the difference in height of said liquid columns.

5. Regulating apparatus for an evaporator, comprising a chamber for containing a column of the evaporator brine supported by the pressure of the liquid within the evaporator, a chamber for containing a fresh water column also supported by the pressure of the brine in the evaporator shell, means for maintaining a substantially fixed brine level, and means controlled by the difference in the height of said two liquid columns for regulating the discharge of concentrated liquid from the evaporator to thereby maintain a substantially constant density in the evaporator shell.

6. In an evaporator system, a pair of fluid containing columns communicating directly with the evaporator shell at its lower portion, means for admitting relatively small quantities of fresh water to the upper end of one of said columns, thereby maintaining the fluid contained therein of substantially no salinity, a regulating float in said fresh water column for controlling discharge of concentrated liquid from said evaporator according to the height of said column, and a float in the brine column for controlling admission of liquid to the evaporator to maintain the liquid in the evaporator at a substantially fixed level.

In testimony whereof I affix my signature.

JOSEPH PRICE.